United States Patent
Patel et al.

(10) Patent No.: US 10,547,561 B1
(45) Date of Patent: Jan. 28, 2020

(54) QUEUING SYSTEM TO ACHIEVE MAXIMUM QUEUING LATENCY IN A COMPUTING DEVICE

(71) Applicant: Juniper Networks, Inc., Sunnyvale, CA (US)

(72) Inventors: Nayan S. Patel, Bedford, MA (US); Craig R. Frink, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 26 days.

(21) Appl. No.: 15/821,635

(22) Filed: Nov. 22, 2017

(51) Int. Cl.
| | |
|---|---|
| *H04L 12/28* | (2006.01) |
| *H04L 12/863* | (2013.01) |
| *H04L 12/26* | (2006.01) |
| *H04L 12/875* | (2013.01) |
| *H04L 12/815* | (2013.01) |
| *H04L 12/819* | (2013.01) |
| *H04L 12/823* | (2013.01) |
| *H04L 12/825* | (2013.01) |

(52) U.S. Cl.
CPC ...... *H04L 47/6255* (2013.01); *H04L 43/0858* (2013.01); *H04L 47/56* (2013.01); *H04L 43/0894* (2013.01); *H04L 47/215* (2013.01); *H04L 47/225* (2013.01); *H04L 47/25* (2013.01); *H04L 47/32* (2013.01)

(58) Field of Classification Search
CPC ...................................................... H04L 12/50
USPC ........................................................ 370/329
See application file for complete search history.

(56) References Cited

U.S. PATENT DOCUMENTS

| | | | |
|---|---|---|---|
| 7,292,578 B1 * | 11/2007 | Kerr | H04L 47/10 370/235 |
| 7,756,977 B2 | 7/2010 | Yong et al. | |
| 8,184,540 B1 | 5/2012 | Perla et al. | |
| 2006/0146722 A1 * | 7/2006 | Dube | H04L 41/145 370/241 |
| 2007/0005925 A1 | 1/2007 | Burkley et al. | |
| 2015/0222560 A1 * | 8/2015 | Kakadia | H04L 47/50 370/235 |
| 2015/0244804 A1 | 8/2015 | Warfield et al. | |
| 2017/0005953 A1 | 1/2017 | Bracha et al. | |
| 2017/0242625 A1 | 8/2017 | Pandurangan et al. | |
| 2017/0317944 A1 | 11/2017 | John et al. | |
| 2017/0366476 A1 | 12/2017 | Sweeney et al. | |

OTHER PUBLICATIONS

Sajassi et al., "BGP MPLS-Based Ethernet VPN," RFC 7432, Internet Engineering Task Force (IETF), Feb. 2015, 56 pp.

* cited by examiner

*Primary Examiner* — Dang T Ton
(74) *Attorney, Agent, or Firm* — Shumaker & Sieffert, P.A.

(57) ABSTRACT

Techniques are disclosed for a queuing system for network devices. In one example, a network device determines a transmit rate of packets from the queue. In one example the network device determines the transmit rate by determining a number of tokens used over a unit of time by a token bucket shaper for the queue to dequeue the packets from the queue, wherein each of the tokens represents a given number of bytes to be dequeued from the queue. The network device determines a temporal queue length of the queue based on a target queue latency and the determined transmit rate. Further, the network device adjusts at least one parameter of the queue based on the determined temporal queue length such that an actual queue latency of the queue at the determined transmit rate is equal to the target queue latency.

21 Claims, 5 Drawing Sheets

QUEUING SYSTEM TO ACHIEVE MAXIMUM QUEUING LATENCY IN A COMPUTING DEVICE

TECHNICAL FIELD

This disclosure generally relates to computing devices and, particularly, queuing in computing devices.

BACKGROUND

A computer network is a collection of interconnected network devices that can exchange data and share resources. Example network devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, the disclosure describes techniques for improved queuing systems in network devices. A network device, such as a router or a switch, may enqueue packets in one or more queues prior to switching internally between packet forwarding engines, or prior to transmitting the packets over the network. In some examples, a queue is paired with a token bucket shaper data structure to regulate the flow of packets into the network. Each unit of time, the token bucket shaper receives a number of tokens. The token bucket shaper must spend tokens to dequeue a corresponding amount of bytes from the queue and transmit them over the network, and may not transmit packets if the token bucket shaper has insufficient tokens to spend. In other words, each token corresponds to a number of bytes that the token bucket shaper is permitted to dequeue from the queue and transmit over the network. Thus, the token bucket shaper acts to regulate the speed at which packets are removed from the queue and transmitted on the network so as to prevent flooding on the network.

An administrator may desire to optimize queue latency of the queue so as to increase the reliability of the networking device. Queue latency refers to a period of time that a packet remains in the queue. At times, the queue may become oversubscribed or the network may become congested. Such occurrences may increase the queue latency because the reduction in bandwidth increases the amount of time that packets spend in the queue, which in turn may cause high latency for network traffic associated with the packets. Furthermore, as the token bucket shaper receives and spends tokens, and as the volume of packets (e.g., bytes) flowing into and out of the networking device changes, the queue latency may change. Because the queuing latency is not static, a queue comprising a static queue length may cause inefficiencies in a networking device.

Accordingly, the techniques of the disclosure describe a queuing system for a networking device that may dynamically adjust the queue length of a queue (e.g., a number of bytes that can be held in the queue at a given time) to achieve static queuing latency or limit maximum queuing latency. In one example, a transmit rate computation engine for the network device receives a target queue latency for the queue (e.g., a target period of time that a packet remains within the queue). Further, the transmit rate computation engine determines a packet transmit rate for a token bucket shaper for the queue. In one example, the transmit rate computation engine monitors the packet transmit rate for the token bucket shaper. In other examples, the transmit rate computation engine determines a number of tokens per unit of time allocated to the token bucker shaper and a number of tokens over the unit of time unused by the token bucket shaper. The transmit rate computation engine determines, based on the ratio of unused tokens to allocated tokens, a token usage rate that approximates a packet transmit rate for the token bucket shaper. Based on the target queue latency and the packet transmit rate, the transmit rate computation engine adjusts at least one parameter of a drop decision engine for the queue so as to adjust an actual queue latency of the queue to approximate the target queue latency. In one example, the transmit rate computation engine adjusts the actual queue latency of the queue by adjusting a length of the queue. In further examples, the transmit rate computation engine adjusts the length of the queue by changing a probability that the drop decision engine enqueues a packet in the queue or a probability that the drop decision engine drops a packet. In this fashion, the queuing system described herein may optimize queue latency so as to diminish networking latency and minimize overconsumption of network bandwidth.

In one example, this disclosure describes a method including: determining, by processing circuitry of a networking device, a transmit rate of packets from a queue; determining, by the processing circuitry, a temporal queue length of the queue based on a target queue latency and the determined transmit rate; and adjusting, by the processing circuitry, at least one parameter of the queue based on the determined temporal queue length such that an actual queue latency of the queue at the determined transmit rate is substantially equal to the target queue latency.

In another example, this disclosure describes a networking device including: a plurality of queues; and processing circuitry connected to the plurality of queues and configured to: determine a transmit rate of packets from a queue of the plurality of queues; determine a temporal queue length of the queue based on a target queue latency and the determined transmit rate; and adjust at least one parameter of the queue based on the determined temporal queue length such that an actual queue latency of the queue at the determined transmit rate is substantially equal to the target queue latency.

In another example, this disclosure describes a non-transitory computer-readable medium including instructions that, when executed, cause processing circuitry of a networking device to: determine a transmit rate of packets from a queue; determine a temporal queue length of the queue based on a target queue latency and the determined transmit rate; and adjust at least one parameter of the queue based on the determined temporal queue length such that an actual queue latency of the queue at the determined transmit rate is substantially equal to the target queue latency.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
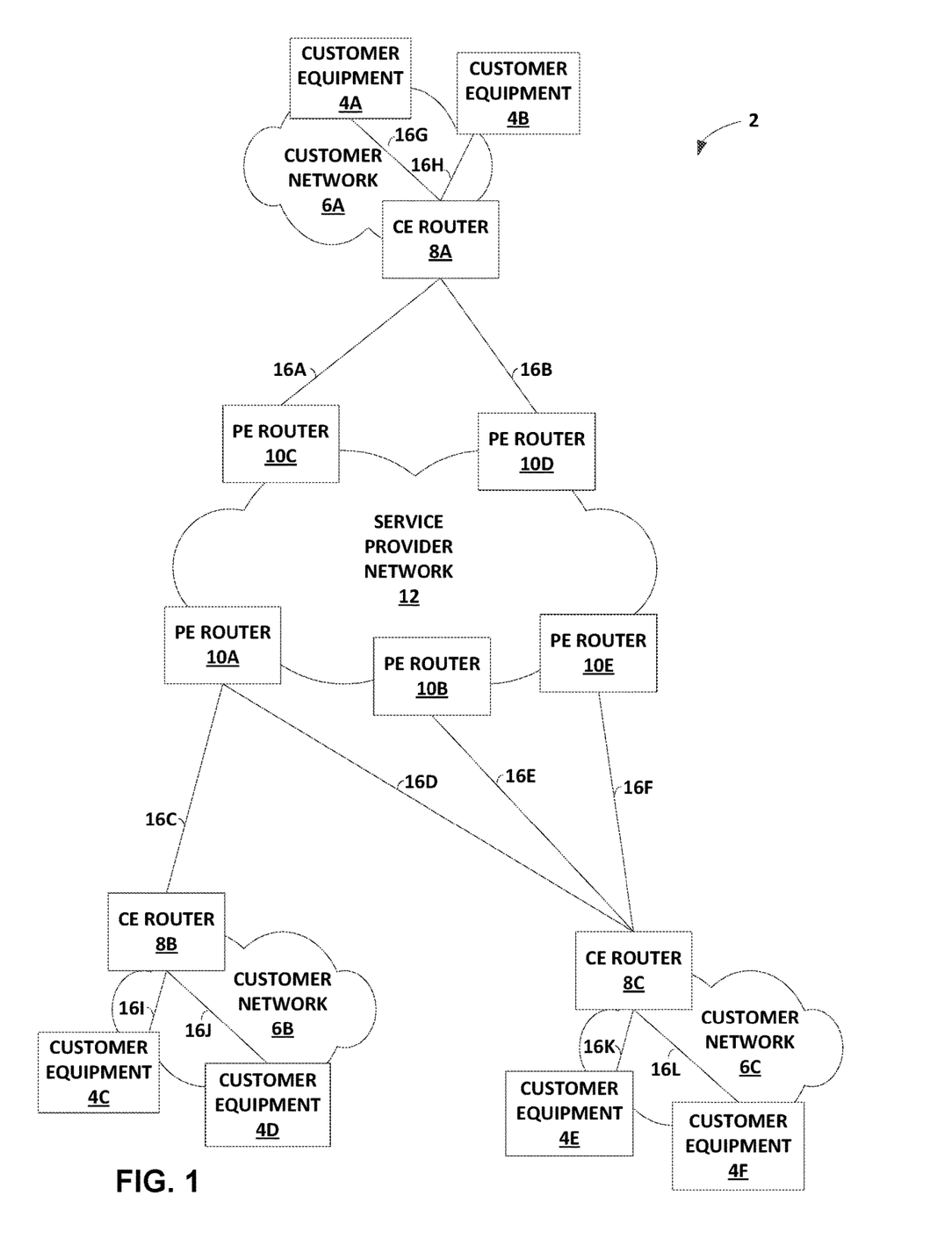
FIG. 1 is a block diagram illustrating an example network in accordance with the techniques of the disclosure.

FIG. 1 is a block diagram illustrating an example computer system 2 in accordance with the techniques of the disclosure. In the example of FIG. 1, computer system 2 includes a service provider network 12 configured to connect disparate customer networks 6A-6C ("customer networks 6"). PE routers 10A-10E ("PE routers 10") of service provider network 12 provide customer equipment 4A-4F ("customer equipment 4") associated with customer networks 6 with access to service provider network 12 via CE routers 8A-8C ("CE routers 8"). Communication links 16A-16L may be Ethernet, ATM or any other suitable network connections.

PE routers 10 and CE routers 8 are illustrated as routers in the example of FIG. 1. However, techniques of the disclosure may be implemented using switches or other suitable network devices that participate in a layer two (L2) and/or layer three (L3) operations and services. Customer networks 6 may be networks for geographically separated sites of an enterprise. Each of customer networks 6 may include additional customer equipment 4, such as, one or more switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A-6C are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publicly accessible networks referred to as the Internet), residential and business class telephone and/or voice services, and residential and business class television services.

FIG. 1 illustrates service provider network 12. In typical operation, PE routers 10A-10E communicate routing and other control information using BGP. PE routers 10 may interoperate using BGP in accordance with the techniques described in "BGP MPLS-Based Ethernet VPN," RFC7432, Internet Engineering Task Force (IETF), February 2015, available at https://tools.ietf.org/html/rfc7432, the entire contents of which is incorporated herein by reference.

As shown in the example of FIG. 1, PE routers 10A-10E may provide an MPLS core for sending network packets between customer networks 6. Each of PE routers 10A-10E implement the MPLS protocol and apply one or more MPLS labels, i.e., a label stack, to network packets in accordance with routing and forwarding information configured at each respective PE router. For example, PE router 10C may attach an MPLS label advertised by PE router 10A to a packet that PE router 10C is forwarding to PE router 10A, such that the packet is forwarded through service provider network 12 to PE router 10A.

A network device may enqueue packets in one or more queues prior to switching internally between packet forwarding engines, or prior to transmitting the packets over the network. Such a network device may include customer equipment 4, CE routers 8, PE routers 10, or other networking equipment, switches, or routers that make up customer networks 6C or service provider network 12 (which are not depicted in FIG. 1 for simplicity). In some examples, the network device may pair each queue with a token bucket shaper data structure to regulate the flow of packets out of the queue. Each unit of time, the token bucket shaper receives a number of tokens. The token bucket shaper must spend tokens to dequeue a corresponding number of bytes from the queue and transmit the bytes over the network as packets. Further, the token bucket shaper may not dequeue bytes from the queue if the token bucket shaper has insufficient tokens to spend. Thus, the token bucket shaper acts to regulate the speed at which bytes are removed from the queue and packets are transmitted on a network, e.g., one of customer networks 6 or service provider network 12, so as to prevent flooding on the network.

An administrator of one of customer networks 6 or service provider network 12 may desire to optimize queue latency of each queue in each network device so as to increase the reliability of the network device (e.g., increase the consistency of packet throughput, packet latency, and bandwidth consumption). As described herein, queue latency refers to a period of time that a packet remains in the queue. If queue latency is too high, such as is the cause during network congestion or oversubscription to the queue, packets may spend too much time in the queue, which may cause high latency for network traffic associated with the packets. Furthermore, as the token bucket shaper receives and spends tokens, and as the volume of packets flowing into and out of the networking device changes, the queue latency may change. Because the queuing latency is not static, a queue comprising a static queue length may cause inefficiencies in a networking device.

Accordingly, the techniques of the disclosure describe a queuing system for a network device that dynamically adjusts the queue length of a queue (e.g., a number of bytes that can be held in the queue at a given time) to achieve static queuing latency or limit maximum queuing latency. In one example, a transmit rate computation engine for a network device (e.g., one of customer equipment 4, CE routers 8, or PE routers 10) receives a target queue latency for a respective queue (e.g., a target period of time that a packet remains within the queue). Further, the transmit rate computation engine determines a packet transmit rate for a token bucket shaper for the queue. In one example, the transmit rate computation engine determines the packet transmit rate by monitoring the packet transmit rate of the token bucket shaper. In another example, the transmit rate computation engine determines the packet transmit rate by receiving a number of tokens per unit of time allocated to the token bucket shaper and a number of tokens over the unit of time that are unused by the token bucket shaper. In some examples, the ratio of unused tokens to allocated tokens can be used to determine a token usage rate that approximates a packet transmit rate for the token bucket shaper. Based on the target queue latency and the packet transmit rate, the transmit rate computation engine of the network device adjusts at least one parameter of a drop decision engine for the queue so as to adjust an actual queue latency of the queue. In this fashion, the queuing system described herein may optimize queue latency so as to diminish networking latency and minimize overconsumption of network bandwidth.

The architecture of system 2 illustrated in FIG. 1 is shown as an example. The techniques as set forth in this disclosure may be implemented in the example system 2 of FIG. 1, as well as other types of systems not described specifically herein. Nothing in this disclosure should be construed so as to limit the techniques of this disclosure to the example architecture illustrated by FIG. 1.

Figure 2:
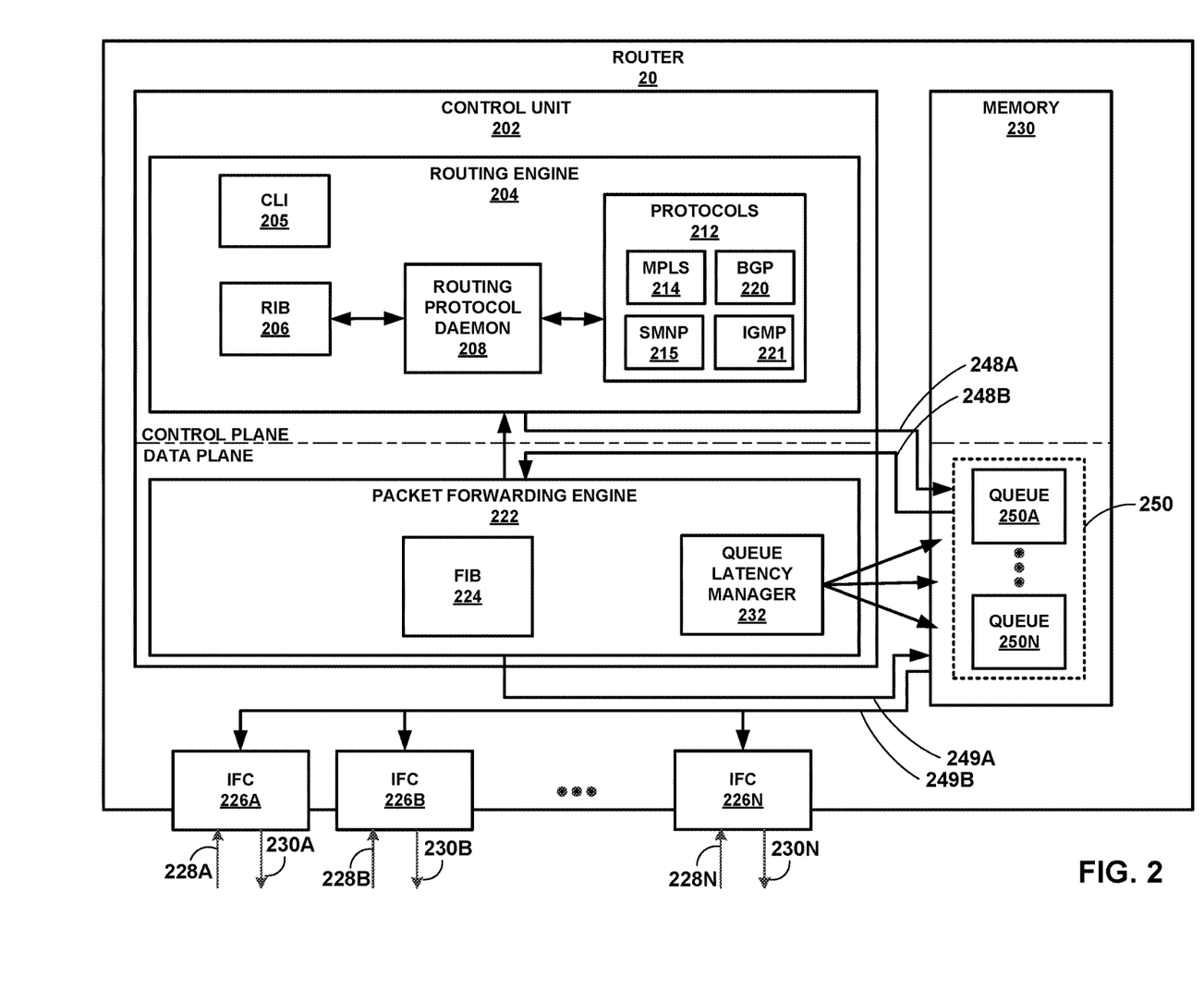
FIG. 2 is a block diagram illustrating an example router 20 within the network of FIG. 1 in accordance with the techniques of the disclosure.

FIG. 2 is a block diagram illustrating an example router 20 within the network of FIG. 1 in accordance with the techniques of the disclosure. In general, router 20 may operate substantially similar to CE routers 8 or PE routers 10 of FIG. 1. In this example, router 20 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 20 also includes a control unit 202 that determines routes of received packets and forwards the packets accordingly via IFCs 226, and a memory 230 in communication with control unit 202.

Control unit 202 includes a routing engine 204 and a packet forwarding engine 222. Routing engine 204 operates as the control plane for router 20 and includes an operating system (not shown) that provides a multi-tasking operating environment for execution of a number of concurrent processes. Routing engine 204, for example, executes software instructions to implement one or more control plane networking protocols 212. For example, protocols 212 may include one or more routing protocols, such as BGP 220, for exchanging routing information with other routing devices and for updating routing information base (RIB) 206. Protocols 212 may further include transport protocols, such as Multiprotocol Label Switching (MPLS) protocol 214, and multicast management protocols, such as Internet Group Management Protocol (IGMP) 221. In other examples, protocols 212 may include other routing, transport, management, or communication protocols.

In some examples, routing engine 204 includes command line interface (CLI) 205 to permit an administrator to configure and/or manage router 20. For example, the administrator may, via CLI 205, access queue latency manager 232 to configure one or more parameters of queues 250. In another example, routing engine 204 includes a graphical user interface (GUI) instead of a CLI. In a still further example, routing engine executes Simple Network Management Protocol (SMNP) 215 to permit the administrator to configure and/or control router 20 from a remote terminal.

Routing protocol daemon (RPD) 208 may execute BGP 220 or other routing protocols to update RIB 206. RIB 206 may describe a topology of the computer network in which PE router 20 resides, and may also include routes through the computer network. RIB 206 describes various routes within the computer network, and the appropriate next hops for each route, i.e., the neighboring routing devices along each of the routes. RPD 208 analyzes information stored in RIB 206 and generates forwarding information for packet forwarding engine 222, which stores the forwarding information in forwarding information base (FIB) 224.

Router 20 further includes memory 230. Memory 230 acts as storage for router 20. In accordance with the techniques of the disclosure, memory 230 may store one or more queues 250A-250N ("queues 250") for router 20. In some examples, memory 230 is random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof.

Each of queues 250 of memory 230 may be a first-in first-out (FIFO) data structure for organization and temporary storage of data. In the example of FIG. 2, queues 250 store one or more packets for router 20. In one example where router 20 includes more than one packet forwarding engine, router 20 stores the one or more packets in one or more queues 250 prior to switching internally between packet forwarding engines (e.g., paths 248A, 248B). In another example, router 20 stores the one or more packets in one or more queues 250 prior to transmitting the packets over the network (e.g., paths 249A, 249B).

Packet forwarding engine 222 operates as the data plane for router 20 and includes FIB 224 and queue latency manager 232. Packet forwarding engine 222, for example, processes packets forwarded and received by router 20 via IFCs 226. For example, packet forwarding engine 222 may apply filters and routing policies to outgoing packets and forward the packets to a next hop in the network. In some examples, control unit 202 includes a plurality of packet forwarding engines, each of which are configured to operate similar to packet forwarding engine 222 to provide packet forwarding functions for different flows of network traffic.

FIB 224 may associate, for example, network destinations for network traffic with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures. In some examples, FIB 224 includes lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Queue latency manager 232 of packet forwarding engine 222 performs management functions for queues 250 in accordance with techniques of this disclosure. In one example, queue latency manager 232 regulates the flow of packets from a respective one of queues 250, e.g., queue 250A. For example, for queue 250A, queue latency manager 232 may implement a respective token bucket shaper data structure to regulate the flow of packets and a shaper credit engine to update a number of credits allocated to the token bucket shaper data structure. In accordance with the techniques of the disclosure, and as described in more detail below, queue latency manager 232 dynamically adjusts the queue length of queue 250A to achieve static queuing latency or limit maximum queuing latency.

In one example, queue latency manager 232 receives, from an administrator, a target queue latency for queue 250A (e.g., a target period of time that a packet remains within the queue). In one examples, the target queue latency is between about 1 microsecond to 100 milliseconds. In another example, the target queue latency is between about 10 milliseconds and 20 milliseconds. In some examples, the administrator may specify the target queue latency via CLI 205. Further, queue latency manager 232 determines a packet transmit rate of the token bucket shaper. In one example, queue latency manager 232 monitors the packet transmit rate of the token bucket shaper. In another example, queue latency manager 232 receives a number of allocated tokens per unit of time for the token bucket shaper and a number of tokens over the unit of time that are unused by the token bucket shaper. Queue latency manager 232 determines, based on the ratio of unused tokens to allocated tokens, a token usage rate that approximates a packet transmit rate of packets from queue 250A. Based on the target queue latency and the packet transmit rate, queue latency manager 232 determines a temporal queue length of queue 250A that adjusts an actual queue latency of queue 250A to approximate the target queue latency. In this fashion, queue latency manager 232 may optimize queue latency for queue 250A so as to diminish networking latency and minimize overconsumption of network bandwidth.

Figure 3:
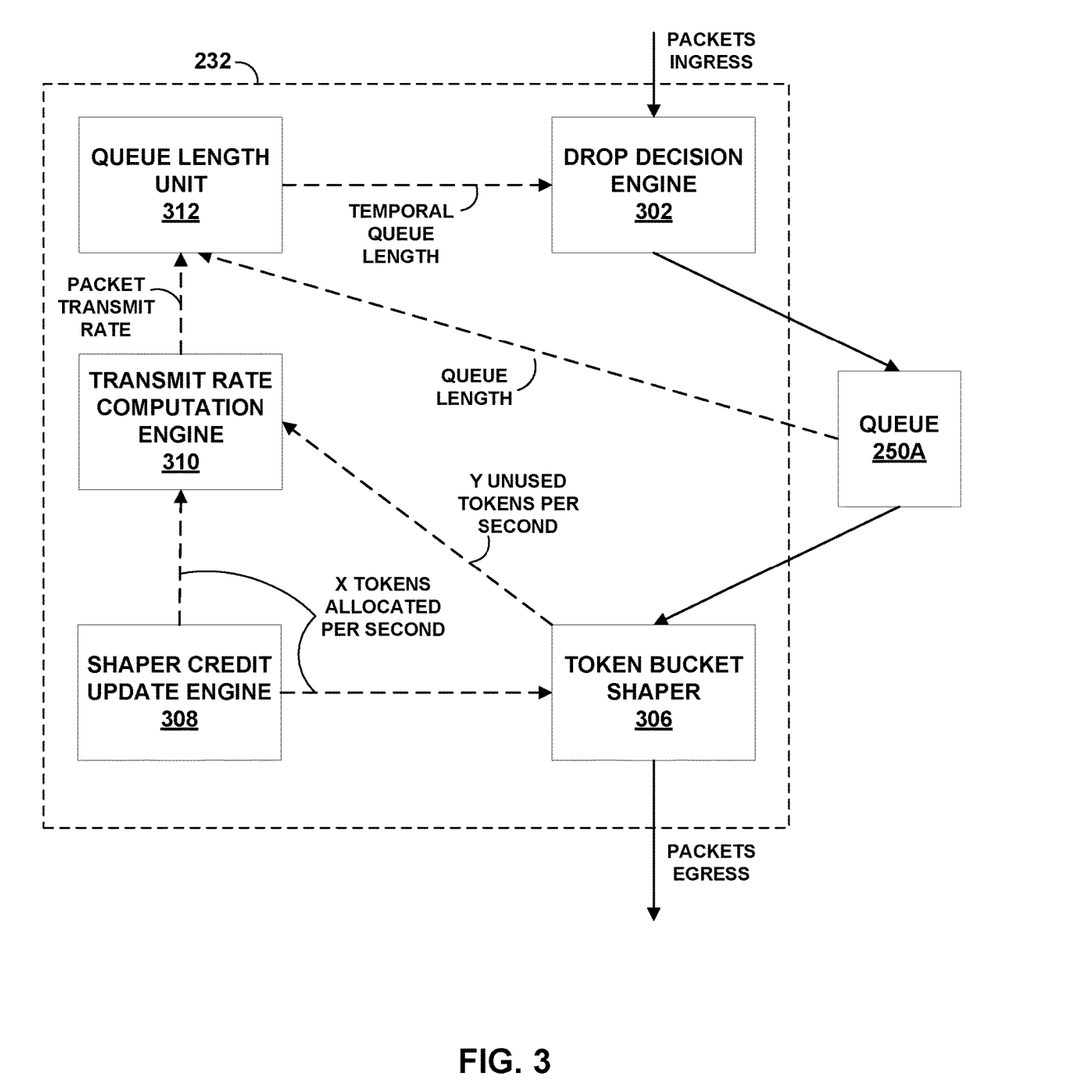
FIG. 3 is a block diagram illustrating an example queue latency manager in accordance with the techniques of the disclosure.

FIG. 3 is a block diagram illustrating an example queue latency manager 232 in accordance with the techniques of the disclosure. Queue latency manager 232 performs management functions for one or more of queues 250 of router 20 of FIG. 2 and may operate in a substantially similar fashion to queue latency manager 232 of FIG. 2. In the example of FIG. 3, queue latency manager 232 performs management functions for queue 250A of router 20, and includes a shaper credit update engine 308, a token bucket shaper 306, a transmit rate computation engine 310, a queue length unit 312, and a drop decision engine 302.

Token bucket shaper 306 is a data structure that regulates dequeuing of packets from queue 250A. Token bucket shaper 306 receives, from shaper credit engine 308, a number of tokens (also referred to as "credits" herein) per unit of time (e.g., token bucket shaper 306 may receive X number of tokens every Y seconds, where X and Y represent any number). In some examples, the number of tokens allocated to token bucket shaper 306 is refreshed each unit of time. In some examples, the unit of time is approximately 1 millisecond. However, in other examples, the unit of time is approximately 1 microsecond, 10 microseconds, or 100 microseconds. The length of the unit of time is system dependent and may be configured by an administrator.

Token bucket shaper 306 spends tokens to dequeue packets from queue 250A. Typically, token bucket shaper 306 may not dequeue packets if the token bucket shaper has insufficient tokens to spend for the number of bytes included in the packets. Thus, the token bucket shaper acts to regulate the speed at which packets are removed from the queue. If, upon dequeuing a packet from queue 250A, the packet is transmitted over a network, token bucket shaper 306 may be used to regulate the flow of packets onto the network such that the flow rate of packets onto the network does not exceed a specified amount, thereby regulating the consumption of bandwidth by router 20. Shaper credit engine 308 may control the flow of packets onto the network by adjusting the number of tokens allocated to token bucket shaper 306 per unit of time. In some examples, token bucket shaper 306 must spend one token to dequeue one byte from queue 250A. In other examples, token bucket shaper 306 must spend one token to dequeue other amounts of data (e.g., 1 bit, 64 bytes). Token bucket shaper 306 may, therefore, spend more than one token to dequeue one packet from queue 250A. The number of bytes that a token is worth is system-dependent and may be configured by an administrator. In one example, token bucket shaper 306 is allocated sufficient tokens to dequeue 1 Gigabit (e.g., 125 Megabytes) of packets per second.

Queue latency manager 232 further includes drop decision engine 302. Drop decision engine 302 receives a network packet and determines whether to enqueue the packet in queue 250A or drop the packet altogether. In some examples, drop decision engine 302 applies an algorithm or heuristic method to received packets to determine whether to enqueue or drop the packets. In one example, drop decision engine 302 enqueues a first percentage of received packets and drops a second percentage of received packets. In another example, drop decision engine 302 drops every Nth packet, where N is any integer, and enqueues the other packets in queue 250A. In yet a further example, drop decision engine 302 applies a random function to determine whether to drop or enqueue each received packet.

In accordance with the techniques of the disclosure, queue latency manager 232 includes transmit rate computation engine 310 configured to determine a packet transmit rate from token bucket shaper 306 in order to dynamically adjust a queue length of queue 250A (e.g., a number of bytes that can be held in the queue at a given time) to achieve static queuing latency or limit maximum queuing latency. In the example of FIG. 3, transmit rate computation engine 310 receives a number of tokens per unit of time allocated to token bucket shaper 306. Further, transmit rate computation engine 310 receives a number of unused tokens over the unit of time from token bucket shaper 306. In some examples, transmit rate computation engine 310 determines, based on the ratio of unused tokens to allocated tokens, a token usage rate of token bucket shaper 306 that approximates a packet dequeue rate (e.g., a packet transmit rate) for token bucket shaper 306. In alternate examples (not depicted in FIG. 3), transmit rate computation engine 310 directly monitors the packet transmit rate from token bucket shaper 306 to determine the packet transmit rate.

In the example of FIG. 3, queue length unit 312 receives the packet transmit rate from transmit rate computation engine 310, and receives, from an administrator via CLI 205, a target queue latency for queue 250A (e.g., a target period of time that a packet remains within queue 250A). In this example, queue length unit 312 uses the target queue latency and the determined packet transmit rate to determine a temporal queue length of queue 250A. Based on the temporal queue length received from queue length unit 312, drop decision engine 302 determines a corresponding value for at least one parameter of drop decision engine 302 so as to adjust an actual queue latency of queue 250A to approximate the target queue latency. In the example of FIG. 3, queue length unit 312 may use a lookup table, a function, or an algorithm to determine the temporal queue length of queue 250A based on the target queue latency and the determined packet transmit rate.

In one example, the at least one parameter of drop decision engine 302 is a probability that drop decision engine 302 enqueues a packet in queue 250A or a probability that drop decision engine 302 drops the packet. By adjusting the rate at which decision engine 302 enqueues a packet in queue 250A or drops the packet, drop decision engine 302 may adjust the number of packets in queue 250A at a given time, thereby adjusting the length of queue 250. For example, drop decision engine 302 may apply the ratio of unused tokens to allocated tokens as a probability that drop decision engine 302 drops the packet.

By adjusting the length of queue 250A, drop decision engine 302 adjusts the actual queue latency of queue 250A. For example, by decreasing the length of queue 250A, a packet will spend less time in queue 250A (e.g., thereby decreasing the actual queue latency of queue 250A). In this fashion, the queuing system described herein may optimize queue latency so as to diminish networking latency and minimize overconsumption of network bandwidth.

As token bucket shaper 306 receives and spends tokens, and as the volume of packets flowing into and out of router 20 changes, the queue latency of queue 250A may change. For example, if queue latency is too high, such as when the network is congested or queue 250A is oversubscribed, packets may spend too much time in queue 250A, which may cause high latency for network traffic associated with the packets. By determining the token usage rate of token bucket shaper 306 as described above, queue latency manager 232 may decrease the queue latency so as reduce the latency for network traffic associated with the packets.

Furthermore, queue latency manager 232 may continuously adjust the queue length of queue 250A as described above to ensure that the actual queuing latency of queue 250A continues to approximate the target queuing latency of queue 250A as the conditions of service provider network 12 change over time. Transmit rate computation engine 310 may determine the packet transmit rate on a periodic basis.

For example, transmit rate computation engine 310 may determine the packet transmit rate each time the tokens allocated to token bucket shaper 306 are refreshed (e.g., once per millisecond, once per microsecond, etc.). Drop decision engine 302 may adjust the temporal length of queue 250A in the manner described above each time a new packet is enqueued in queue 250A. For example, drop decision engine 302 may adjust one of a drop threshold or a drop probability based on a queue length of queue 250A determined at the time of enqueuing the new packet and the most recently determined packet transmit rate from queue 250A.

In the foregoing example, queue latency manager 232 adjusts the temporal length of queue 250A each time a new packet is enqueued in queue 250A. However, in an alternate implementation, queue latency manager 232 may perform an operation as described above upon detecting that the actual queuing latency of queue 250A deviates from the target queuing latency of queue 250A. For example, queue latency manager 232 may perform an operation as described above upon detecting that the actual queuing latency of queue 250A deviates from the target queuing latency of queue 250A by a predetermined amount specified by the administrator. In this example, each time that queue latency manager 232 detects that the actual queuing latency of queue 250A deviates from the target queuing latency by a predetermined percentage of the target queuing latency (e.g., more or less than 5%, 10%, 25% of the target queuing latency), queue latency manager 232 adjusts the queue length of queue 250A as described above to ensure that the actual queuing latency of queue 250A continues to approximate the target queuing latency of queue 250A. In another example, each time that queue latency manager 232 detects that the actual queuing latency of queue 250A deviates from the target queuing latency by a predetermined amount of time from the target queuing latency (e.g., more or less than 5 milliseconds, 10 milliseconds, or 100 milliseconds from the target queuing latency), queue latency manager 232 adjusts the queue length of queue 250A as described above to ensure that the actual queuing latency of queue 250A continues to approximate the target queuing latency of queue 250A. In some examples, queue latency manager 232 adjusts the queue length of queue 250A as described above in incremental amounts so as to provide further granular adjustment to the queuing latency of queue 250A. Accordingly, queue latency manager 232 as described herein may dynamically adjust the queue length of queue 250A to achieve static queuing latency or limit maximum queuing latency. In this fashion, queue latency manager 232 may optimize queue latency so as to diminish networking latency and minimize overconsumption of network bandwidth.

Figure 4:
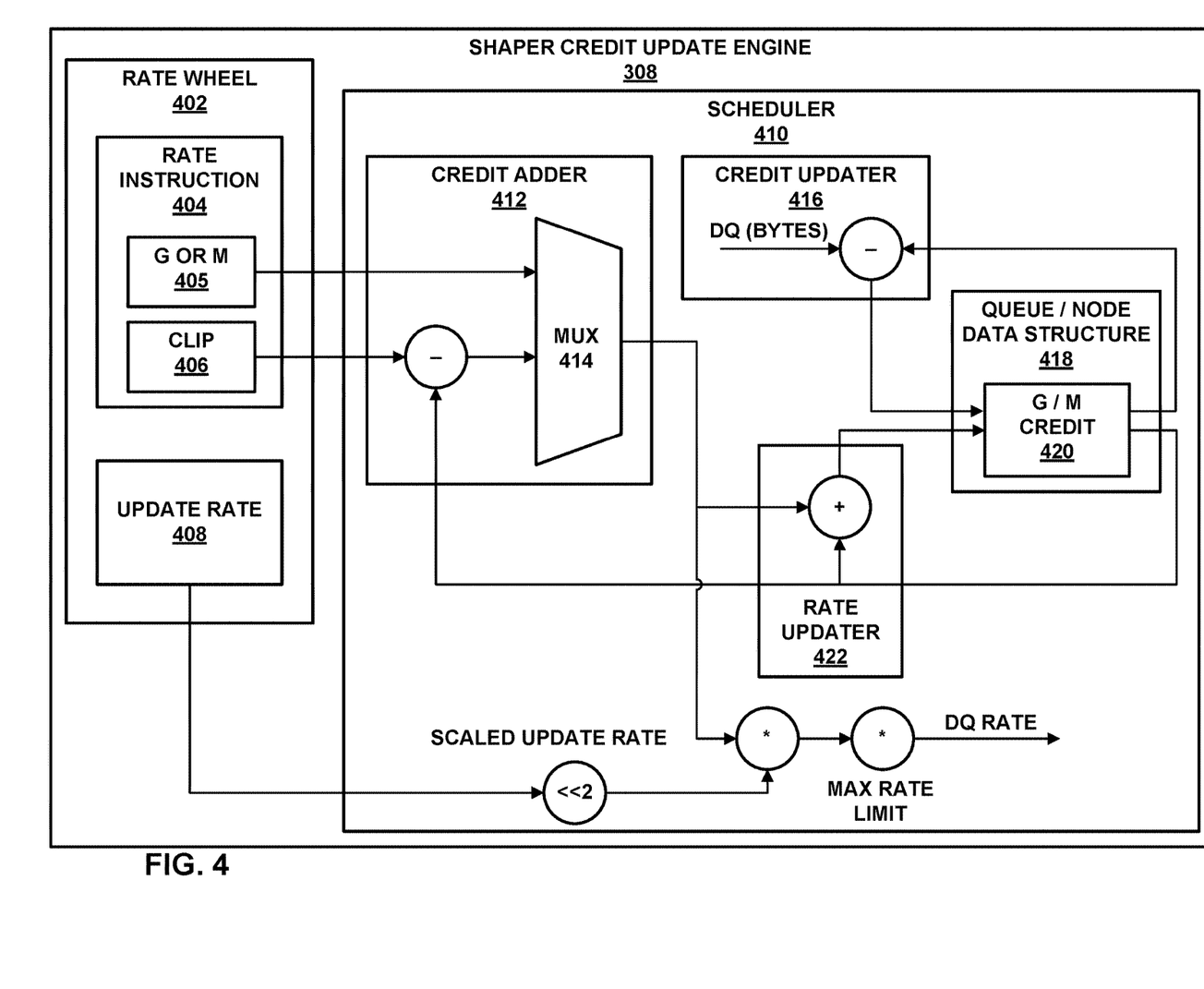
FIG. 4 is a block diagram illustrating an example shaper credit update engine in accordance with the techniques of the disclosure.

FIG. 4 is a block diagram illustrating an example shaper credit update engine 308 of FIG. 3 in accordance with the techniques of the disclosure. In one example implementation, shaper credit update engine 308 includes rate wheel 402 and scheduler 410. In some examples, scheduler 410 is an implementation of token bucket shaper 306 of FIG. 3. In some examples, queue/node data structure is an implementation of queue 250A of FIGS. 2 and 3.

Rate wheel 402 provides credit updates to scheduler 410. Scheduler 410 may use credits to determine when queue/node data structure 418 is permitted to transmit one or more bytes enqueued by queue/node data structure 418. In the example of FIG. 4, rate wheel 402 includes rate instruction 404 and update rate 408. Rate instruction 404 provides rate updates for "Guaranteed" (G) and "Maximum" (M) credit fields to credit adder 412 of scheduler 410. G credits may be used to allocate a guaranteed amount of bandwidth to queue/node data structure 418, unless the G rate for the network is oversubscribed. M credits may be used as a rate limit to prevent queue/node data structure 418 from exceeding a specified average transmit rate.

In addition, update rate 408 represents a rate at which credits are being updated by rate wheel 402. Update rate 408 provides a normalized dequeuing rate to queue/node data structure 418. In the example of FIG. 4, update rate 408 is the inverse of a rate update period for rate wheel 402. In some examples, scheduler 410 applies a low-pass filter to smooth instantaneous changes in the dequeuing rate. In further examples, scheduler 410 applies a filter coefficient to the update rate to determine how responsive the dequeuing rate is to changes in the update rate.

Scheduler 410 includes credit adder 412, credit updater 416, rate updater 422, and queue/node data structure 418. Credit adder 412 of scheduler 410, based on input from clip 406, provides additional credits to rate updater 422, which in turn provides such additional G/M credits 420 to queue/node data structure 418. Depending on the value of the current credits and clip 406, rate updater 422 may add some, all, or none of the credits to G/M credits 420 of queue/node data structure 418. Scheduler 410 uses G/M credits 420 to determine when queue/node data structure 418 is permitted to transmit. In one example, when G/M credits 420 for queue/node data structure 418 are non-negative, scheduler 410 may dequeue or transmit packets from queue/node data structure 418. Upon dequeuing and transmitting the packets from queue/node data structure 418, credit updated 416 removes a corresponding number of credits from G/M credits 420 for queue/node data structure 418. Once G/M credits 420 for queue/node data structure 418 are negative, queue/node data structure 418 becomes ineligible for dequeuing or transmitting subsequent packets. Upon accumulating a non-negative value of G/M credits 420, queue/node data structure 418 again becomes permitted to dequeue or transmit packets.

In a steady state environment, one may accurately predict a queuing latency of a packet (or group of packets), based on a length of a queue and a transmit rate of the queue. However, in practice, the queue length of queue/node data structure 418 may change significantly (e.g., during a burst of enqueuing activity). Further, the transmit rate of the queue may change significantly based on congestion of scheduler 410 or the network.

In accordance with the techniques of the disclosure and as described above, transmit rate computation engine 310 of FIG. 3 may determine a packet transmit rate from a queue (e.g., queue/node data structure 418) such that queue latency manager 232 may dynamically adjust a queue length of the queue. In some examples, transmit rate computation engine 310 receives a number of tokens over a unit of time that rate wheel 402 allocates to scheduler 410 and a number of tokens over the unit of time that scheduler 410 does not use. In some examples, transmit rate computation engine 310 determines, based on the ratio of unused tokens to allocated tokens, a token usage rate of scheduler 410 that approximates a packet transmit rate (e.g., a packet dequeue rate) for queue/node data structure 418. In other examples, scheduler 308 provides, from rate wheel 402, the packet dequeue rate as the packet transmit rate to transmit rate computation engine 310.

Queue length unit 312 receives, from transmit rate computation engine 310, the packet transmit rate, and further receives, from an administrator, a target queue latency for queue/node data structure 418. Queue length unit 312 uses the target queue latency and the determined packet transmit rate to determine a temporal queue length of queue/node data structure 418. Based on the temporal queue length received from queue length unit 312, drop decision engine 302 determines a corresponding value for at least one parameter of drop decision engine 302 so as to adjust an actual queue length of queue/node data structure 418. By adjusting the actual queue length, drop decision engine 302 may adjust an actual queue latency of queue 250A to approximate the target queue latency. In some examples, decision drop engine 302 updates the approximation of the queuing latency each rate update period (e.g., about once per 1 millisecond) of rate wheel 402.

Figure 5:
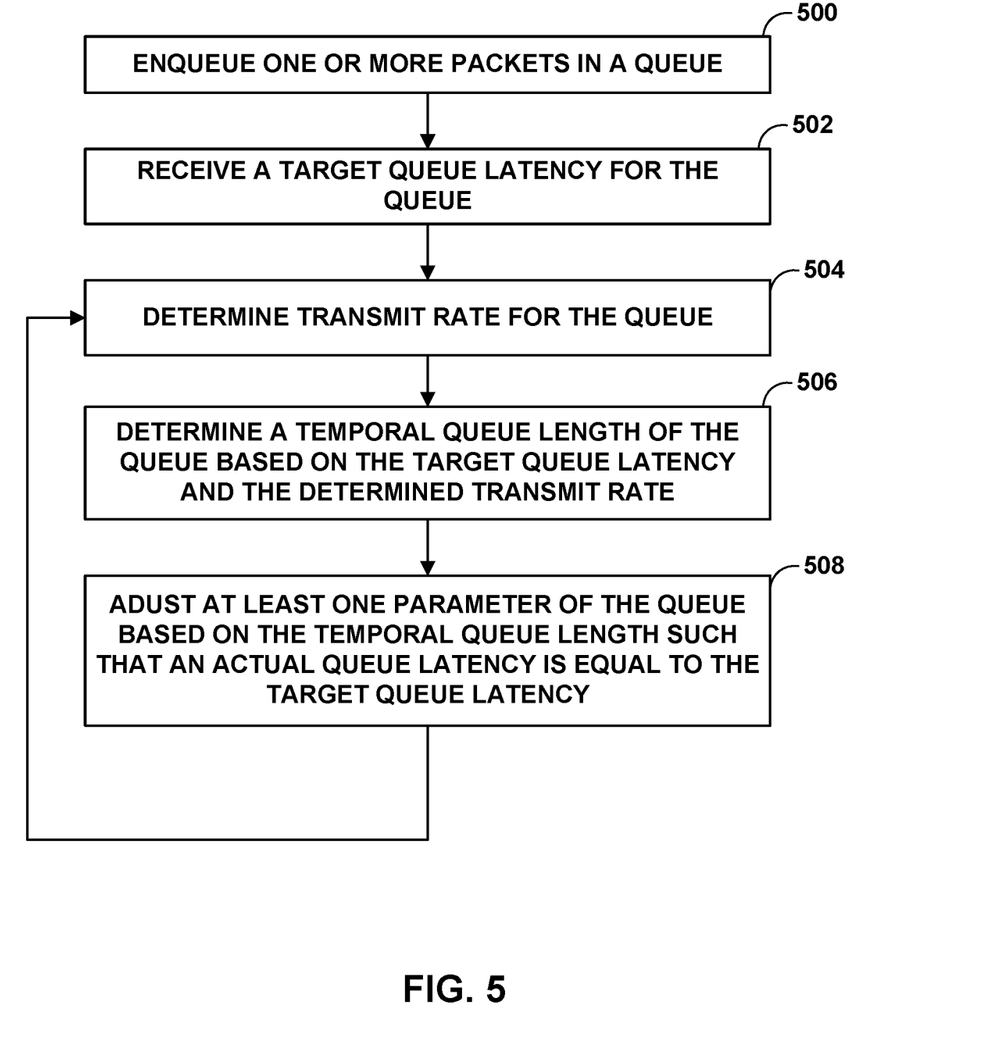
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIGS. 2 and 3.

In the example of FIG. 5, routing engine 204 enqueues one or more bytes in queue 250A (500). In one example, the bytes stored within queue 250A are one or more packets that are queued internally prior to switching from a first packet forwarding engine 222 to a second packet forwarding engine 222. In other examples, the bytes stored within queue 250A are one or more packets that are queued prior to being transmitted onto network 12 by packet forwarding engine 22 and via IFCs 226.

Routing engine 204 receives, from an administrator via CLI 205, a target queue latency for the queue (502). In other examples, routing engine 204 receives the target queue latency via a GUI or via SMNP protocol. Routing engine 204 passes the target queue latency to queue latency manager 232.

Queue latency manager 232 determines a transmit rate from queue 250A (504). In one example, queue latency manager 232 monitors the transmit rate from token bucket shaper 306. In another example, queue latency manager 232 receives a number of tokens per unit of time allocated to token bucket shaper 306 for dequeuing the one or more packets from queue 250A and a number of tokens over the unit of time that are unused token bucket shaper 306. In this example, each of the tokens represents a given number of bytes to be dequeued from the queue. In one example, shaper credit update engine 308 allocates a first number of tokens per unit of time to token bucket shaper 306 and further provides this first number to transmit rate computation engine 310. Token bucket shaper 306 provides a second number of unused tokens per unit of time to transmit rate computation engine 310. Transmit rate computation engine 310 calculates the transmit rate from the queue by subtracting the second number of unused tokens per unit of time from the first number of tokens per unit of time. In other examples, transmit rate computation engine 310 calculates the transmit rate from the queue by comparing the ratio of the second number of unused tokens per unit of time to the first number of tokens per unit of time.

Queue length unit 312 determines a temporal queue length of the queue 250A based on the target queue latency and the determined transmit rate (506). Queue length unit 312 may use a lookup table, a function, or an algorithm to determine the temporal queue length of queue 250A based on the target queue latency and the determined packet transmit rate.

Drop decision engine 302 adjusts at least one parameter of queue 250A based on the determined temporal queue length such that an actual queue latency of the queue at the determined transmit rate is substantially equal to the target queue latency (508). In other words, the drop decision engine adjusts the at least one parameter of queue 250A to adjust the actual queue latency such that the actual queue latency approximates the target queue latency. In one example, the at least one parameter of drop decision engine 302 is a probability that drop decision engine 302 enqueues a packet in queue 250A or a probability that drop decision engine 302 drops the packet. By adjusting the rate at which decision engine 302 enqueues a packet in queue 250A or drops the packet, drop decision engine 302 may adjust the number of packets in queue 250 at a given time, thereby adjusting the length of queue 250. Thus, by adjusting the length of queue 250A, queue latency manager 232 may adjust the time that a particular packet is enqueued within queue 250A, thereby adjusting the actual queue latency of queue 250A. For example, by decreasing the length of queue 250A, a packet will spend less time in queue 250A (e.g., thereby decreasing the actual queue latency of queue 250A). In this fashion, the queuing system described herein may optimize queue latency so as to diminish networking latency and minimize overconsumption of network bandwidth.

Furthermore, queue latency manager 232 may iteratively or continuously adjust the queue length of queue 240A as described above to ensure that the actual queuing latency of queue 250A continues to approximate the target queuing latency of queue 250A as the conditions of service provider network 12 change over time. For example, transmit rate computation engine 310 may determine the packet transmit rate on a periodic basis each unit of time that tokens are allocated to token bucket shaper 306 (e.g., once per millisecond, once per microsecond, etc.). As a further example, drop decision engine 302 may adjust the temporal length of queue 250A in the manner described above each time a packet is enqueued in queue 250A. Accordingly, queue latency manager 232 as described herein may dynamically adjust the queue length of queue 250A to achieve static queuing latency or limit maximum queuing latency. In this fashion, queue latency manager 232 may optimize queue latency so as to diminish networking latency and minimize overconsumption of network bandwidth.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   determining, by processing circuitry of a networking device, a transmit rate of packets from a queue;
   determining, by the processing circuitry, a temporal queue length of the queue based on a target queue latency and the determined transmit rate; and
   adjusting, by the processing circuitry, at least one parameter of a drop decision engine for the queue based on the determined temporal queue length, wherein the drop decision engine determines whether to drop or enqueue one or more subsequent packets in the queue to adjust an actual queue latency of the queue at the determined transmit rate to be substantially equal to the target queue latency.

2. The method of claim 1, wherein adjusting the at least one parameter of the drop decision engine for the queue comprises adjusting one of a drop threshold or a drop probability applied to the one or more subsequent packets such that a number of bytes of the subsequent packets enqueued in the queue does not exceed the temporal queue length.

3. The method of claim 2, wherein adjusting the one of the drop threshold or the drop probability applied to the one or more subsequent packets comprises adjusting a rate at which the one or more subsequent packets are enqueued in the queue to maintain the queue at the determined temporal queue length such that the actual queue latency of the queue at the determined transmit rate is substantially equal to the target queue latency.

4. The method of claim 1, wherein determining the transmit rate comprises measuring the transmit rate of packets from the queue.

5. The method of claim 1, wherein determining the transmit rate comprises:
   determining a number of tokens used over a unit of time by a token bucket shaper for the queue to dequeue one or more packets from the queue, wherein each of the tokens represents a given number of bytes to be dequeued from the queue; and
   determining, based on the number of tokens used over the unit of time, the transmit rate.

6. The method of claim 5, wherein determining the number of tokens used over the unit of time comprises:
   determining, by the processing circuitry, a first number of tokens per the unit of time allocated to the token bucket shaper;
   determining, by the processing circuitry, a second number of tokens per the unit of time from the token bucket shaper that are not used to dequeue the one or more packets from the queue during the unit of time; and
   calculating the first number of tokens minus the second number of tokens per the unit of time.

7. The method of claim 1, wherein determining the transmit rate comprises determining the transmit rate of packets from the queue on a periodic basis.

8. The method of claim 1, wherein determining the temporal queue length of the queue comprises determining the temporal queue length of the queue each time a packet is enqueued in the queue.

9. The method of claim 1, wherein determining the temporal queue length based on the target queue latency and the determined transmit rate comprises retrieving, based on the target queue latency and the determined transmit rate, the temporal queue length of the queue from a look-up table.

10. The method of claim 1, wherein determining the temporal queue length based on the target queue latency and the determined transmit rate comprises applying a function to the target queue latency and the determined transmit rate to calculate the temporal queue length.

11. A networking device comprising:
a plurality of queues; and
processing circuitry connected to the plurality of queues, wherein the processing circuitry includes a drop decision engine for at least one queue of the plurality of queues, and wherein the processing circuitry is configured to:
 determine a transmit rate of packets from the queue;
 determine a temporal queue length of the queue based on a target queue latency and the determined transmit rate; and
 adjust at least one parameter of the decision drop engine for the queue based on the determined temporal queue length, wherein the drop decision engine determines whether to drop or enqueue one or more subsequent packets in the queue to adjust an actual queue latency of the queue at the determined transmit rate to be substantially equal to the target queue latency.

12. The networking device of claim 11, wherein, to adjust at least one parameter of the drop decision engine for the queue, the processing circuitry is configured to adjust one of a drop threshold or a drop probability applied to the one or more subsequent packets such that a number of bytes of the subsequent packets enqueued in the queue does not exceed the temporal queue length.

13. The networking device of claim 12, wherein, to adjust the one of the drop threshold or the drop probability applied to the one or more subsequent packets, the processing circuitry is configured to adjust a rate at which the one or more subsequent packets are enqueued in the queue to maintain the queue at the determined temporal queue length such that the actual queue latency of the queue at the determined transmit rate is substantially equal to the target queue latency.

14. The networking device of claim 11, wherein, to determine the transmit rate, the processing circuitry is further configured to measure the transmit rate of packets from the queue.

15. The networking device of claim 11, wherein, to determine the transmit rate, the processing circuitry is further configured to:
 determine a number of tokens used over a unit of time by a token bucket shaper for the queue to dequeue one or more packets from the queue, wherein each of the tokens represents a given number of bytes to be dequeued from the queue; and
 determine, based on the number of tokens used over the unit of time, the transmit rate.

16. The networking device of claim 15, wherein, to determine the number of tokens used over the unit of time, the processing circuitry is further configured to:
 determine a first number of tokens per the unit of time allocated to the token bucket shaper;
 determine a second number of tokens per the unit of time from the token bucket shaper that are not used to dequeue packets from the queue during the unit of time; and
 calculate the first number of tokens minus the second number of tokens per the unit of time.

17. The networking device of claim 11, wherein, to determine the transmit rate, the processing circuitry is further configured to determine the transmit rate of packets from the queue on a periodic basis.

18. The networking device of claim 11, wherein, to determine the temporal queue length of the queue, the processing circuitry is further configured to determine the temporal queue length of the queue each time a packet is enqueued in the queue.

19. The networking device of claim 11, wherein, to determine the temporal queue length based on the target queue latency and the determined transmit rate, the processing circuitry is configured to retrieve, based on the target queue latency and the determined transmit rate, the temporal queue length of the queue from a look-up table.

20. The networking device of claim 11, wherein, to determine the temporal queue length based on the target queue latency and the determined transmit rate, the processing circuitry is configured to apply a function to the target queue latency and the determined transmit rate to calculate the temporal queue length.

21. A non-transitory computer-readable medium comprising instructions that, when executed, cause processing circuitry of a networking device to:
 determine a transmit rate of packets from a queue;
 determine a temporal queue length of the queue based on a target queue latency and the determined transmit rate; and
 adjust at least one parameter of a drop decision engine for the queue based on the determined temporal queue length, wherein the drop decision engine determines whether to drop or enqueue one or more subsequent packets in the queue to adjust an actual queue latency of the queue at the determined transmit rate to be substantially equal to the target queue latency.

* * * * *